United States Patent

[11] 3,604,341

| [72] | Inventor | James H. Coroneos<br>Frederick and Thistle Rds., Baltimore, Md. 21228 |
|---|---|---|
| [21] | Appl. No. | 866,969 |
| [22] | Filed | Oct. 16, 1969 |
| [45] | Patented | Sept. 14, 1971 |

[54] VERTICAL ROTISSERIE
4 Claims, 6 Drawing Figs.

[52] U.S. Cl. .................................................. 99/421 V,
99/446, 99/447
[51] Int. Cl. .................................................. A47j 37/04
[50] Field of Search ........................................ 99/419,
420, 421, 358, 391, 442, 443, 375, 400, 408, 425,
446; 17/1 S; 30/322

[56] References Cited
UNITED STATES PATENTS
1,871,654   8/1932   Blier .............................. 99/421 V UX

| 2,566,524 | 9/1951 | Kammins | 99/421 H UX |
|---|---|---|---|
| 2,687,080 | 8/1954 | Dorin | 99/421 V X |
| 2,795,183 | 6/1957 | Parr et al. | 99/421 H |
| 2,956,497 | 10/1960 | Bernstein | 99/421 H |

FOREIGN PATENTS

| 343,997 | 1/1960 | Switzerland | 99/421 |
|---|---|---|---|
| 554,483 | 1/1957 | Belgium | 99/421 M |

*Primary Examiner*—Walter A. Scheel
*Assistant Examiner*—Arthur O. Henderson
*Attorney*—Walter G. Finch

ABSTRACT: A vertical rotisserie is provided which consists of an electric barbecue arrangement having an arcuate heating element in the general focus of which a rotatable spit is mounted. The axis is vertical so as to protect the heating element from drippings which instead are collected in a drip pan under the end of the spit.

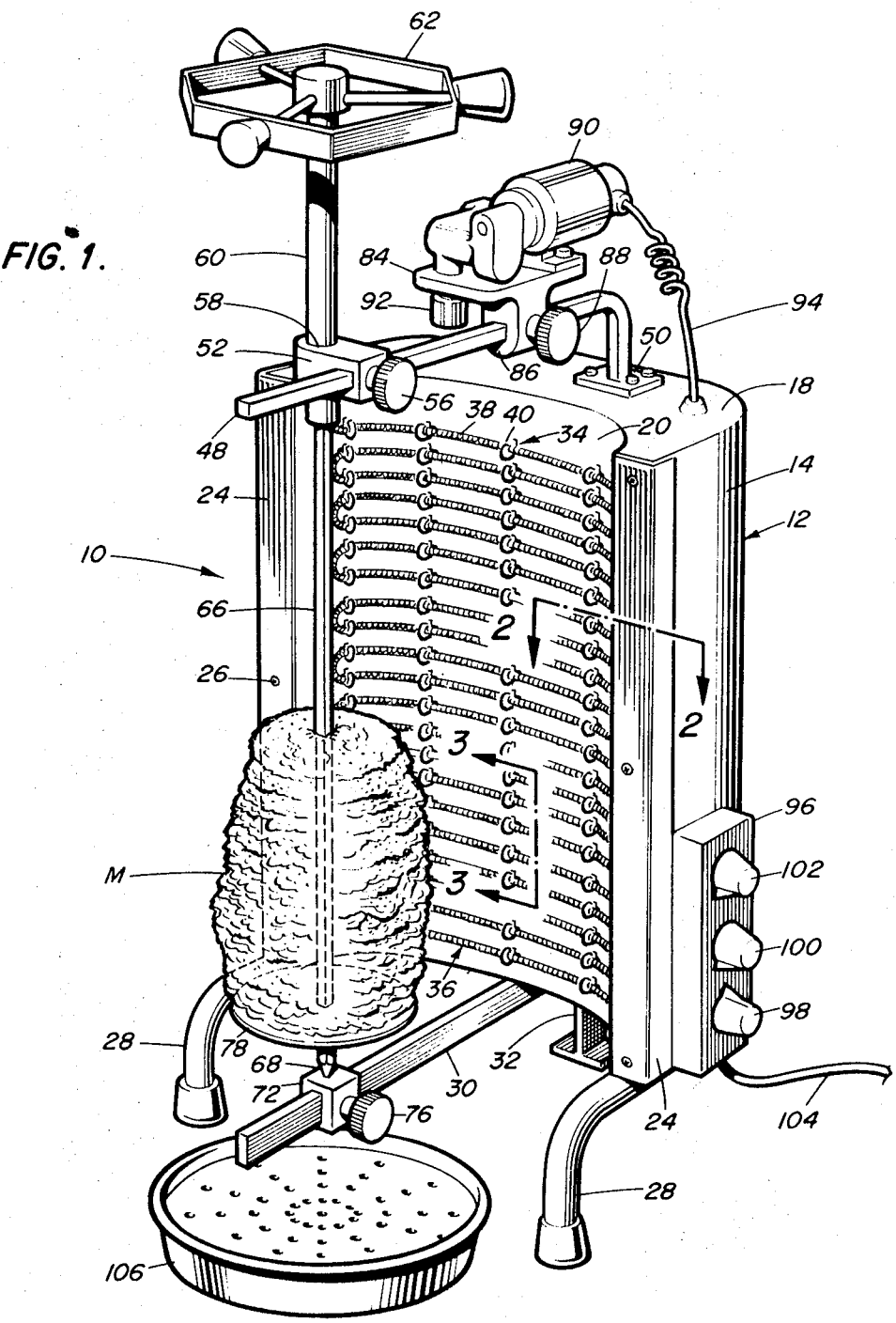

PATENTED SEP 14 1971

JAMES H. CORONEOS
INVENTOR

BY *Walter G. Finch*
ATTORNEY

VERTICAL ROTISSERIE

This invention relates generally to a rotisserie device, and more particularly, it relates to an electrically heated, curved heat element having a vertical line focus wherein a rotatable spit is mounted.

Drippings from meat being roasted have always been a problem in rotisseries of conventional style. Not only was the heat source corrupted by this behavior, but, in addition, the drippings were fouled, burnt and made unsuitable for reuse as basting or gravy.

It is an object of this invention, therefore, to provide an open type of rotisserie suitable for table top use wherein the heating of the meat is by focused radiant heat in a vertical plane.

Another object of this invention is to provide an optional hand or motor-driven rotisserie in which self-basting and electrical heating is graduated from one end of a cylinder of meat to the other and wherein one end of the meat can be cooked well or dry, while the other end at the same time is cooked rare or juicy.

Yet another object of the invention is to provide a drippings arrangement in a rotisserie wherein the collecting dish or pan is not exposed to direct heat.

Still another object of the invention is to provide an improved rotisserie arrangement which is capable of expansion to accommodate large cuts of meat as for commercial restaurant requirements and into which the radiant heat is more deeply and efficiently transmitted and utilized.

An important object of the invention resides in the skewing arrangement whereby the meat is accessible for carving from the top end while the remainder continues to rotate and cook. As the bulk is thus reduced to the ultimate the adjustable focusing can be changed by any increment to suit.

Other objects and attendant advantages of this invention will become more readily apparent and understood from the following detailed specification and accompanying drawings in which:

FIG. 1 is a perspective view of the improved rotisserie incorporating features of this invention;

Figure 4:
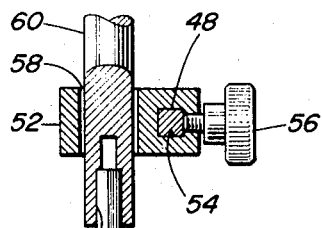
FIG. 4 is a view, partly in section, of the vertical spit mounting arrangement.

Referring now to the details of the drawings, reference numeral 10 in FIG. 1 indicates generally a rotisserie embodying features of this invention. This rotisserie 10 consists of a hollow main body 12 having a side and rear wall wrapper 14 of metal, and upper and lower end plates 18.

Figure 2:
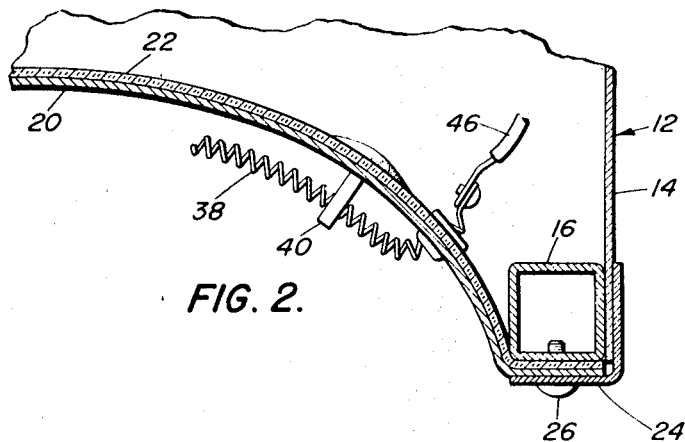
FIG. 2 is a fragmentary detail view taken on line 2—2 of FIG. 1.

The end plates 18 are cut arcuate on one edge to conform with a polished metal curved reflector panel 20 which mounts thereagainst and whose sides are secured to the sides of the wrapper 14 by corner finishing angles 24 and screws 26 as best shown in FIG. 2. These screws 26 also extend into vertical corner structural members 16, preferably of square metal tubing, as shown best in FIG. 2. An insulating blanket 22, as shown best in FIG. 2, of refractory material such as asbestos backs up the reflector panel 20.

The lower end plate 18 mounts a pair of tubular metal spaced side legs 28 which curve downwardly a short distance, well forwardly of the body 10. Centrally between the legs 28, there is provided an L-shaped bar 30 which also extends forwardly from the underside of the lower endplate 18. A vertical leg 32 is provided under plate 18, which forms a third supporting leg.

Radiant heat is provided by an upper burner or heater 34 and a lower burner or heater 36 mounted on the reflector panel 20. These burners 34 and 36 comprise electric heater elements 38 which are supported by a plurality of spaced refractory clips 40, shown best in FIGS. 1, 2, 3, 5 and 6 so as to be held away from the face of the reflector panel 20 and to conform generally to its curved shape.

Figure 3:
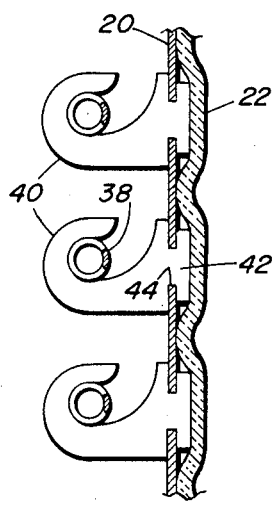
FIG. 3 is a fragmentary vertical section taken on line 3—3 of FIG. 1.
Figure 5:
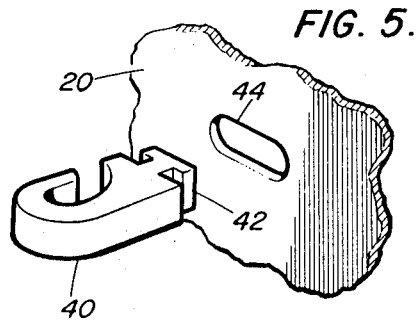
FIGS. 5 and 6 show the method and arrangement for mounting the refractory clips for the heater elements by giving them a quarter turn in a slot.
Figure 6:
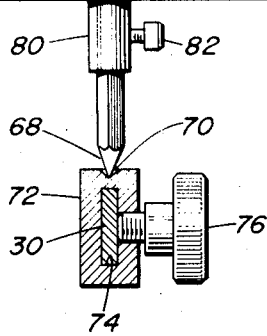

A preferred method and arrangement for supporting these clips 40 is shown in section in FIG. 3 where a T-shaped portion 42 of the clip extends through the panel 20. As shown in FIG. 5, portion 42 of the clip 40 is first inserted sideways through a slot 44 and then as in FIG. 6, the clip 40 is rotated a quarter turn to be captivated therein.

The heater elements 38, which may be of bare wire as shown, or of the tubular enclosed type, are then strung back and forth across the face of the panel 20 being received in the clips 40 as shown in FIGS. 1, 2, and 3. Insulated wiring 46 is secured to the ends of the heater elements 38 behind the panel 20.

An upper support 48 is mounted on a pad 50 from the top surface of the upper end plate 18 and it runs in parallel extension with the lower bar 30. This support 48 is of rectangular cross section and mounts a slidable block 52 having a rectangular hole or aperture 54 to suit, as shown best in FIG. 4. A thumb screw 56 is threaded into the block 52 to allow the latter to be desirably positioned. A vertical hole 58 in the block 52 provides a free fit for a rod 60 having a wheel or knobbed frame 62 at its upper end. This allows the manual rotation of a vertical skewer 66 which fits into a shallow square hole 64 in the lower end of rod 60.

The skewer 66 is provided with a pointed lower end 68 which pivots in a V-cavity 70 of another slidably block 72, as shown in FIGS. 1 and 4. This block 72 has a rectangular slot 74 so as to saddle upon the lower extending bar 30. A thumb screw 76 threaded into the side of the block 72 allows it to be secured in a desired position. In general, this position will be such that meat M, impaled upon the skewer 66, will be located to rotate on an axis coinciding with the focal line of the curved reflector panel 20.

A circular plate 78, having a hollow boss 80 is slidably supported on the skewer 66 and supports and positions the meat M with respect to the upper or lower burners 34 and 36. This location of the boss 80 is fixed by means of a screw 82 which passes through the boss 80 and bears upon the skewer 66. Thus, exposure to either burner 34, 36 or both provides a variation in the degree of cooking of the meat M for any desired degree or location of thoroughness.

As shown in FIG. 1, a table 84 is mounted by an apertured depending boss 86 on the upper support 48. This table 84 may be pulled forward and secured by a setscrew 88 to supplant the block 52 and associated manual drive rod 60. A geared motor 90 is mounted on the table 84 with its drive socket 92 depending below. This socket 92 receives the upper end of the skewer 66 and rotates the meat M when the motor 90 is energized by the flexible wiring 94.

A control box 96 is provided on the body 12 and it contains a control 98 for the lower burner 34, another control 100 for the upper burner 36, and a speed control 102 for the motor 90, with the power supply cord being designated 104.

Any pan or dish 106 may be used to catch the drippings from the meat M as it cooks, being located below and out of the radiation focal line of the burners 34 and 36. The self-basting of the meat M carries out over the surface of the meat M in a generally vertically descending helix from one end to the other, with the lower end receiving the most. Obviously, no possibility exists that the burners 34 and 36 will become coated with drippings from the meat M and, in addition, no contamination or burning of the drippings will occur.

Obviously many modifications and variations of the present invention are possible in light of the above teachings. It is, therefore, to be understood that within the scope of the appended claims the invention may be practiced otherwise than as specifically described.

1. A vertically arranged rotisserie, comprising, structure defining a hollow body having a polished metal arcuate shaped, vertically mounted reflector panel as part of the wall of said body, means for insulating one side of said reflector panel, arcuate horizontally arranged heating elements spaced adjacent to the other side of said arcuate shaped reflector panel, said heater elements being divided into two sections, including an upper set of heater elements and a lower set of heater elements, with said sections of heater elements being operated independently of each other, clip means for detachable mounting each said heater element to said reflector panel, an electrical circuit including a source of power for said heating elements, means including a rotatable mounted spit positioned in substantially the focus of said arcuate shaped reflector panel for receiving meat to be barbecued, means for rotating said spit, means for controlling the rotational movement of said spit, means for positioning said spit spacely parallel with respect to said reflector panel, and means for recovering the drippings of said meat.

2. A vertically arranged rotisserie as recited in claim 1, and additionally means for angularly positioning of said spit with respect to the vertical axis of said rotisserie.

3. A vertically arranged rotisserie as recited in claim 1, and additionally means adjustably positioned on said spit for supporting and positioning said meat to be barbecued.

4. A vertically arranged rotisserie as recited in claim 3, wherein said means for supporting and positioning said meat consists of a circular plate.